W. A. HOPKINS.
HINGES.
No. 179,409.    Patented July 4, 1876.
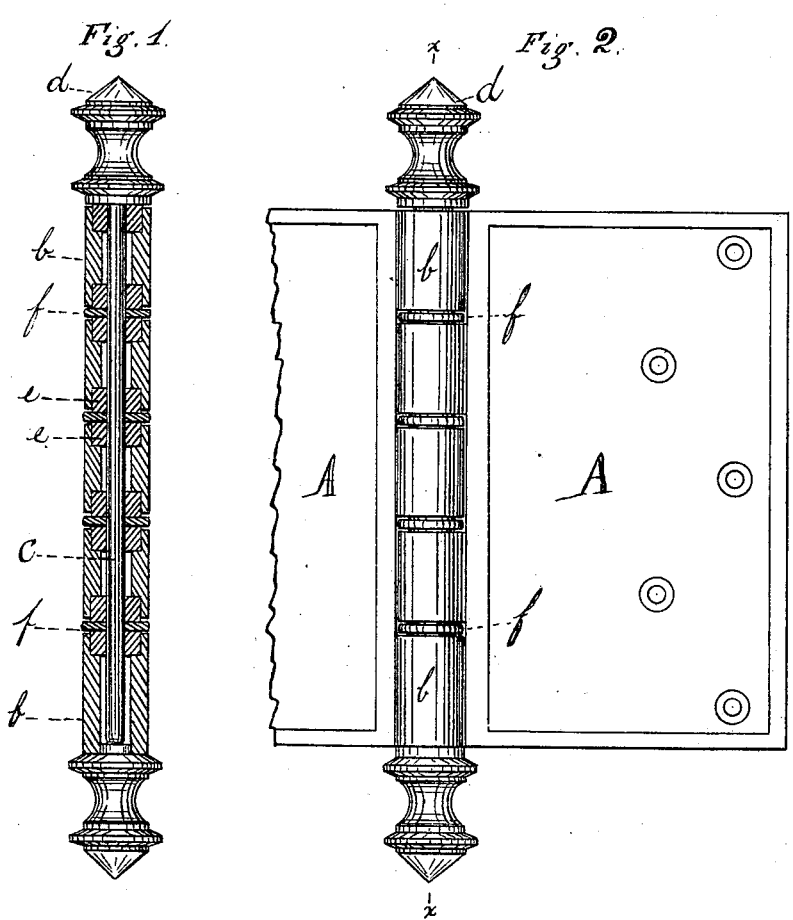
Witnesses.    Inventor.

UNITED STATES PATENT OFFICE.

WILLIAM A. HOPKINS, OF DARLINGTON, N. J., ASSIGNOR TO HOPKINS & DICKINSON MANUFACTURING COMPANY, OF NEW YORK, N. Y.

IMPROVEMENT IN HINGES.

Specification forming part of Letters Patent No. 179,409, dated July 4, 1876; application filed May 25, 1875.

*To all whom it may concern:*

Be it known that I, WILLIAM A. HOPKINS, of Darlington, State of New Jersey, have invented a new and useful Improvement in Hinges; and that the following is a full, clear, and exact description of the same, reference being had to the accompanying drawings, in which—

Figure 1 is a sectional view through the knuckles on the line $x\,x$. Fig. 2 is a front view.

Like letters indicate like parts in both figures.

My improvement is specially intended to be applied to butts or hinges of large size when made of bronze, brass, or other metal the wearing qualities of which are not equal to that of iron or steel.

Butts or hinges are made in three ways, and are known as "loose-pin," "steady-pin," and "loose-joint" butts. My improvement relates to the introduction of hard-metal wearing-surfaces in all the portions of the hinge or butt subjected to wear.

In the drawing, I show a loose-pin butt. The flaps A A are made in any way and of any shape. The knuckles $b\,b$ are the same as are ordinarily made, except that they do not meet when the two flaps are put together, and the pin $c$ is of iron or steel, surmounted by an ornamented piece, $d$. I introduce into each knuckle two annular thimbles of iron or, preferably, steel, $e\,e$, which may or may not be continuous in each knuckle-section; if not continuous, the bronze, or brass, or other metal of which the hinge or butt is made, which is between the thimbles in each section, is bored out larger than the hole in the thimbles, which hole is made just to fit the pin used. These thimbles project from each knuckle-section slightly, and when the flaps are put together a space is left between the thimbles, which, as stated, project slightly from each knuckle-section. Disks or washers, one or more, of iron or steel, $f\,f$, are interposed between the ends of the thimbles in each section, the thickness of which shall be equal to the space between the thimbles, and the outside diameter of which shall about correspond with the outside diameter of the knuckles $b\,b$. Through the center of these disks or washers is a hole, through which the pin $c$ passes. Each joint between the knuckle-sections is thus guarded by a hard material. The thimbles $e\,e$ which are in the knuckles $b\,b$ are made fast therein, so that they cannot turn or become loose. This may be accomplished by a projecting point or points, or by riveting the metal of the knuckles firmly around the thimbles. Although the thimbles are firmly fixed, the washers or disks $f\,f$ are free to revolve when the butt is being used. About one-eighth ($\frac{1}{8}$) of an inch is a sufficient thickness for these disks or washers, though they may be thicker or thinner, as occasion may require, especially if more than one be used for the purpose of decreasing friction.

Instead of the two fixed thimbles $e\,e$ with the loose disks or washers $f\,f$ between them, I sometimes use fixed thimbles, each having a flange in diameter about the diameter of the knuckle-section $b\,b$, which flanges take the place of the washers or disks shown in my drawing. The faces of these flanges take all the wear between the knuckle-sections, thus rendering the washers or disks unnecessary, except they be used for reducing friction.

It will thus be seen that at each joint the whole wear is taken by the two thimbles and the washers or disks, or by the flanges of the thimbles, if they are used, and that the wear on the pin within the knuckles is taken upon the inside surfaces of the thimbles, and not upon the knuckles. Thus all the wearing-surfaces are formed of iron or steel, and in no place does the metal of which the hinge is made rub or wear upon itself, or even upon the surface of another metal. A butt made as described may be formed of the softest or hardest metal, and may be of any size, and, if constructed as described, its wearing qualities will be precisely the same as though the butt was made entirely of the hardest material.

I am aware that disks or washers have been used between the knuckle-sections of hinges; but I believe the combination as described is new.

It will be observed that the arrangement of the thimbles or bushings $ee$ is such that all wear upon the metal of the butt within the knuckles will be prevented, the entire wear being between the steel or iron pin and the steel or iron thimbles or bushings. By making the bushings within the knuckles of considerable length I obtain a larger surface for wear; consequently I prefer to make them almost meet in the center of the knuckle-section, or, under some circumstances, a continuous bushing may be provided for each knuckle-section.

Having above described my invention, what I desire to secure by Letters Patent is—

A hinge or butt, having two thimbles or bushings, and one or more disks or washers at each knuckle-joint, so arranged that no wear of the material of which the hinge or butt is made is possible.

New York, May 22, A. D. 1875.

WM. A. HOPKINS.

Witnesses:
    THOS. BABCOCK, Jr.
    PHILLIPS ABBOTT.